United States Patent [19]

Stroeters et al.

[11] Patent Number: 5,653,410
[45] Date of Patent: Aug. 5, 1997

[54] NON-PIVOTING WIRE HARNESS CLIP WITH OFFSET SHANK

[75] Inventors: Kurt H. Stroeters, Clawson; Darin A. Loruss, Brighton, both of Mich.

[73] Assignee: Chrysler Corporation, Auburn Hills, Mich.

[21] Appl. No.: 517,489

[22] Filed: Aug. 21, 1995

[51] Int. Cl.$^6$ ........................................ F16L 3/00
[52] U.S. Cl. .................. 248/73; 248/70; 248/71
[58] Field of Search ...................... 248/71, 73, 74.2, 248/68.1, 69, 70, 49, 56; 411/504, 508, 509, 510, 913, 400, 401

[56] References Cited

U.S. PATENT DOCUMENTS

| | | | |
|---|---|---|---|
| 2,362,317 | 11/1944 | Smith | 248/71 |
| 3,252,677 | 5/1966 | Raymond | 248/68.1 |
| 3,839,777 | 10/1974 | Puzio | 29/203 |
| 4,358,081 | 11/1982 | Notoya | 248/73 |
| 4,369,947 | 1/1983 | Kuwano | 248/74 A |
| 4,457,482 | 7/1984 | Kitagawa | 248/74.3 |
| 4,509,710 | 4/1985 | Cooper et al. | 248/73 |
| 4,566,660 | 1/1986 | Anscher et al. | 248/74.2 |
| 4,572,466 | 2/1986 | Yamaguchi et al. | 248/73 |
| 4,865,281 | 9/1989 | Wollar | 248/71 |
| 4,900,210 | 2/1990 | Buchanan et al. | 411/510 X |
| 4,989,822 | 2/1991 | Fannon | 248/632 |
| 5,014,939 | 5/1991 | Kraus et al. | 248/70 |
| 5,106,040 | 4/1992 | Cafmeyer et al. | 248/73 |
| 5,161,759 | 11/1992 | Burns et al. | 248/74.2 X |
| 5,209,441 | 5/1993 | Satoh | 248/74.2 |
| 5,306,098 | 4/1994 | Lewis | 411/510 |
| 5,316,245 | 5/1994 | Ruckwardt | 248/74.2 X |
| 5,368,261 | 11/1994 | Caveney et al. | 411/913 X |
| 5,387,065 | 2/1995 | Sullivan | 411/510 X |
| 5,393,185 | 2/1995 | Duffy, Jr. | 411/510 |
| 5,505,411 | 4/1996 | Heaton et al. | 248/73 X |

Primary Examiner—Leslie A. Braun
Assistant Examiner—Sandra Snapp
Attorney, Agent, or Firm—Margaret A. Dobrowitsky

[57] ABSTRACT

A vehicle wire harness clip has a thumbpad and two connector posts depending downwardly from the thumbpad. A person can urge against the thumbpad to press the posts into respective receiving holes that are formed in the body of the vehicle. An offset shank extends laterally away from the thumbpad, and the shank terminates in a harness support surface. A wire harness can be taped to the support surface and thus held in a position that is laterally offset from the thumbpad. Because two connector posts are included, the clip cannot undesirably pivot about either clip.

5 Claims, 1 Drawing Sheet

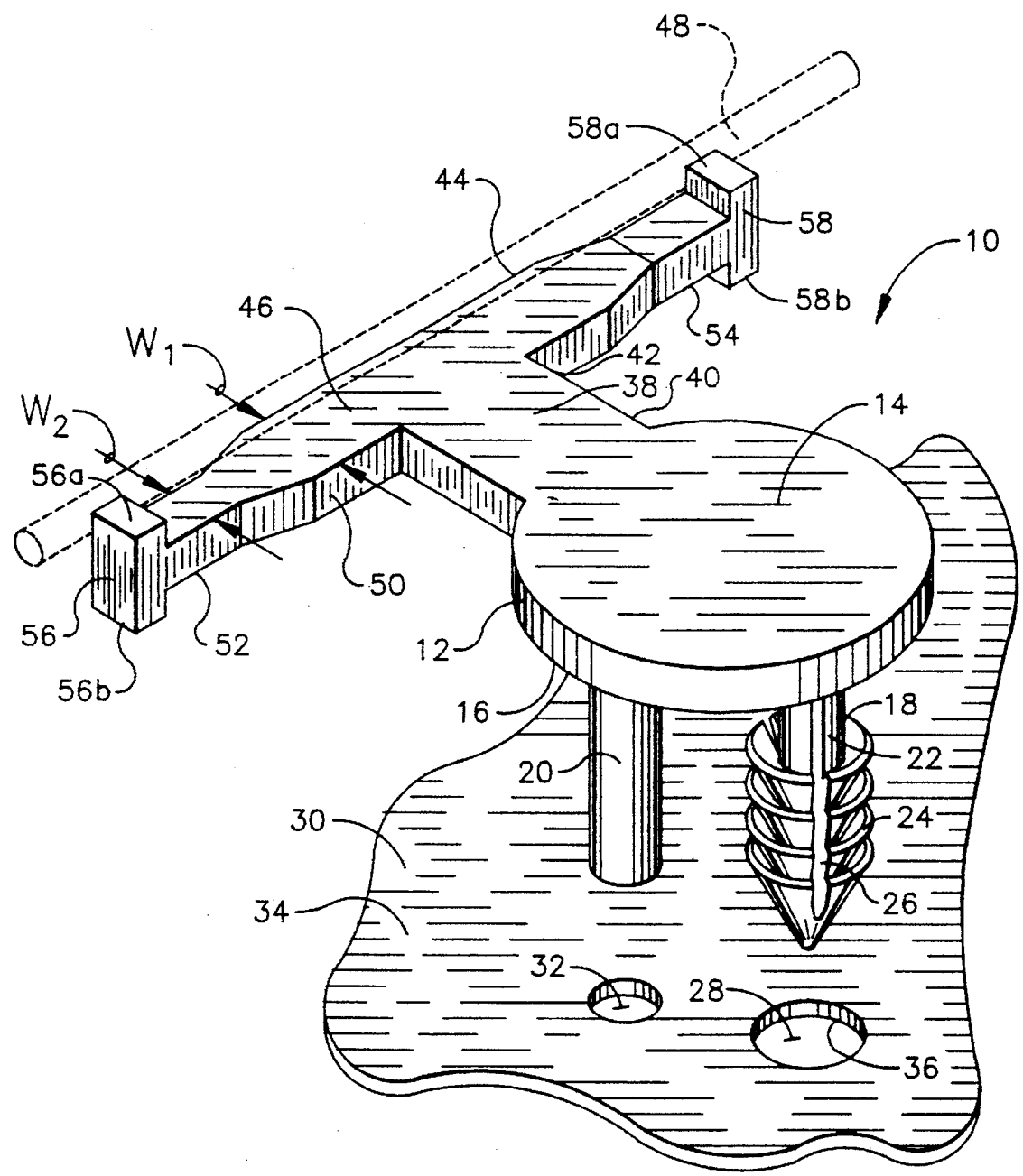

5,653,410

NON-PIVOTING WIRE HARNESS CLIP WITH OFFSET SHANK

FIELD OF INVENTION

The present invention relates generally to automotive electrical wiring harnesses, and more particularly to clips for holding wiring harnesses in vehicles.

BACKGROUND OF THE INVENTION

Electrical wires provide electrical transmission paths between a vehicle's battery/alternator and the various loads serviced by the vehicle's electrical system. Although the wires are connected to their own associated components, for much of their length it is convenient to position the wires side-by-side to establish what are referred to as wire harnesses.

To secure the harnesses to the vehicle body and thereby reduce or eliminate potentially harmful and dangerous interference between the harnesses and other vehicle components, as well as between harnesses and occupants of the vehicle, the harnesses are attached to connectors, often referred to as clips, and the clips in turn are attached to the vehicle body. One such clip, colloquially known as a "pine tree" clip is disclosed in U.S. Pat. No. 5,368,261.

As disclosed in the '261 patent, a clip establishes a surface on which a wire harness is positioned. A post including a spaced apart pair of legs having retention barbs or teeth extending outwardly therefrom depends downwardly from the surface, and the barbs or teeth can ratchetably engage a hole in the vehicle body to hold the clip in the hole and, thus, to hold the wire harness against the body.

It happens that in the arrangement disclosed the '261 patent, the clip surface on which the wire harness is positioned is directly above the post. In some applications, however, it is desirable that the wire harness (and, hence, the surface of the clip against which the wire harness is to be positioned) be offset from the particular portion of the vehicle body intended to support the harness, so that, e.g., the harness clears interfering structure. In other words, it is sometimes desirable that the harness-supporting surface of the clip not be directly above the post, but be offset therefrom, to thereby support the wire harness in a position that is spaced from the particular portion of the vehicle body that must support the harness.

Accordingly, clips have been introduced in which the harness supporting surface of a clip is offset from the attachment post of the clip. Unfortunately, because of the torque inherently caused by the harness offset, such clips tend to undesirably pivot about their attachment posts. When such clips pivot, the harnesses can be moved into undesirable positions that might cause the harness to interfere with other components. Such interference can cause wear of the harness insulation and mechanical strain on the wires in the harness, potentially leading to electrical fires, occupant shock, and equipment damage.

Accordingly, it is an object of the present invention to provide an offset wire harness clip for a vehicle in which pivoting of the clip is substantially eliminated. Another object of the present invention is to provide an offset wire harness clip for a vehicle which is easy to use and cost-effective to manufacture.

SUMMARY OF THE INVENTION

A non-pivoting clip is disclosed for connecting a vehicle wire harness to a vehicle surface having at least two holes formed therein. The clip holds the wire harness laterally distanced from the holes, and the clip includes a thumbpad which defines an upper surface that is ergonomically configured for contacting a person's hand. Moreover, the thumbpad also defining a lower surface which is opposed to the upper surface.

First and second connector posts depend downwardly from the thumbpad. In accordance with the present invention, each post is receivable in a respective hole of the vehicle surface such that the clip cannot pivot about either post when the posts are engaged with the holes. An offset shank has a first end connected to the thumbpad and a second end distanced from the thumbpad, and a harness support surface is connected to the second end of the offset shank. The wire harness is juxtaposed with the harness support surface and is thereby held distanced from the vehicle surface holes.

Preferably, the first post is a ratchet connector which has a shaft and a plurality of ratchet teeth extending outwardly from the shaft. The ratchet teeth cooperate with the vehicle to hold the first post in one of the vehicle surface holes.

In the presently preferred embodiment, the harness support surface is established by a harness support element. Per the present invention, the harness support element defines first and second ends, and the harness support element is connected to the offset shank substantially intermediate the first and second ends. Advantageously, the thumbpad, offset shank, and harness support element are formed unitarily together.

Still further, the harness support element defines first and second tape guide necks near the first and second ends, respectively. The first and second ends of the harness support element establish respective tape guide ears protruding away from the respective tape guide necks.

In another aspect of the present invention, in a vehicle having at least two holes formed therein, a clip is disclosed for holding a wire harness of the vehicle stationary with respect to the at least two holes. The clip includes at least two connectors configured for engaging respective holes, and a wire harness support surface is connected to the connectors and is laterally offset therefrom for supporting the wire harness thereon.

The details of the present invention, both as to its structure and operation, can best be understood in reference to the accompanying drawings, in which like reference numerals refer to like parts, and in which:

BRIEF DESCRIPTION OF THE DRAWING

The FIGURE is a perspective view of the offset wire harness clip of the present invention, with the wire harness shown in phantom and portions of the vehicle body broken away for clarity.

DETAILED DESCRIPTION OF THE PREFERRED EMBODIMENT

Referring now to the FIGURE, an offset wire harness clip is shown, generally designated 10. As shown, the clip 10 includes a generally disc-shaped thumbpad 12 defining an upper surface 14 and a lower surface 16 that is opposed to the top surface 14. Owing to its relatively large, disc-shaped upper surface 14, the thumbpad 12 is ergonomically configured for contacting a person's hand, and more specifically for enabling a person to comfortably press his thumb against the upper surface 14. If desired, the upper surface 14 may be slightly padded to this end.

The FIGURE shows that a ratchet connector post 18 and a cylindrical anti-pivot pin 20 depend downwardly from the lower surface 16 of the thumbpad 12. It is to be understood that if desired, both the post 18 and the pin 20 can be configured alike one another. Apart from the particular configuration of the post 18 and pin 20, however, it is to be understood that owing to the use of more than a single connector, the clip 10 cannot pivot about either the post 18 or the pin 20.

As intended by the present invention, the ratchet connector post 18 can be configured like one of the connectors disclosed in U.S. Pat. Nos. 4,396,329 or 5,368,261, incorporated herein by reference, or the post 18 can be characterized by other ratchet configurations. In the presently preferred embodiment, the post 18 includes a generally cylindrical leg 22. A plurality of resilient retention barbs or teeth 24 are formed on the leg 22 in rows, and the barbs or teeth 24 extend radially outwardly from the leg 22. As shown in the FIGURE, each barb or tooth 24 is a generally semi-circular, upwardly angled, disc-like protrusion that is formed opposite a like barb or tooth 24 on the leg 22 and that is separated from the like barb or tooth by a space 26.

As can be appreciated in reference to the FIGURE, the post 18 can be engaged with a post hole 28 that is formed in a vehicle 30, while the pin 20 can be engaged with a pin hole 32 that likewise is formed in the vehicle 30. As can be further appreciated from the FIGURE, the post 18 ratchetably engages the post hole 28.

To this end, the diameter of the post 18 as measured between the outer edges of opposed barbs or teeth 24 is slightly larger than the diameter of the post hole 28. Consequently, the post 18 can be urged into the post hole 28 owing to the angled configuration of the barbs or teeth 24, and when the post 18 is so urged, the barbs or teeth 24 can deform toward their respective spaces 26 to permit the post 18 to clear an upper surface 34 of the vehicle 30. It may now be more fully appreciated that the upper surface 14 of the thumbpad 12 provides a convenient, ergonomic surface against which a person can urge his thumb to push the post 18 into the post hole 28.

In contrast, again owing to the angled configuration of the barbs or teeth 24, the post 18 cannot easily be pulled out of the post hole 28. Instead, those barbs or teeth 24 nearest a lower surface 36 of the vehicle 30 cooperate with the lower surface 36 to maintain the clip 10 securely mounted on the vehicle 30.

In addition to the structure disclosed above, the FIGURE shows that a flat, generally parallelepiped-shaped offset shank 38 has a thumbpad end 40 that is connected to and preferably formed integrally with the thumbpad 12. Further, the offset shank 38 has an offset end 42 opposed to the thumbpad end 40 and connected to or more preferably formed integrally with a wire harness support element 44. As shown in the FIGURE, the second end 42 of the offset shank 38 is distanced from the first end 40. Accordingly, the support element 44 is laterally offset from the thumbpad 12 and, hence, from the post 18 and pin 20.

With particular regard to the wire harness support element 44, the element 44 defines a wire harness support surface 46 against which a vehicle wire harness 48 can be juxtaposed. In other words, the support surface 46 supports the harness 48.

In the presently preferred configuration, the harness support element 44 is formed with a parallelepiped-shaped middle support segment 50 which defines a width $W_1$. As shown, the middle support segment 50 tapers inwardly to left and right end segments 52, 54, each of which defines a width $W_2$ which is less than the width $W_1$ of the middle support segment 50.

Each end segment 52, 54 terminates in a pair of respective parallelepiped-shaped upper and lower end ears 56$a,b$ and 58$a,b$ that protrude laterally outwardly from the end segments 52, 54. As intended by the present invention, the end segments 52, 54 establish tape guide necks around which adhesive tape can be wrapped to hold the wire harness 48 onto the support surface 46. The ears 56$a,b$ and 58$a,b$ retain the tape on the end segments 52, 54.

Preferably, the clip 10 is a unitary structure, i.e., the thumbpad 12, offset shank 38, and harness support element 44 are formed integrally together, with the harness support element 44 being formed with the offset shank 38 substantially intermediate the first and second end ears 56, 58. Advantageously, the clip 10 is made of lightweight molded plastic.

With above disclosure in mind, it may now be appreciated that the wire harness 48 can be taped or otherwise fastened to the support surface 46 and thereby held stationary with respect to the holes 28, 32 and hence with respect to the vehicle 30. Moreover, the wire harness 48 is laterally offset from the post 18 and pin 20 and, hence, from the portion of the vehicle 30 surface which engages the clip 10. Nonetheless, the torque on the post 18 and pin 20 caused by the weight of the wire harness 48 in combination with the lever arm established by the offset shank 38 does not cause pivoting of the clip 10, because two connectors are used as disclosed to fasten the clip 10 to the vehicle 30.

While the particular NON-PIVOTING WIRE HARNESS CLIP WITH OFFSET SHANK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. In a vehicle having at least two holes formed therein, a clip for holding a wire harness of the vehicle stationary with respect to the at least two holes, comprising:

a thumbpad defining a continuously uninterrupted planar disc-shaped surface having no discontinuities for ergonomic manipulation of the thumbpad;

at least two connectors depending downwardly from the thumbpad and configured for engaging respective holes; and a wire harness support surface unitarily connected to the connectors and laterally offset therefrom for supporting the wire harness thereon.

2. The clip of claim 1, wherein the connectors are connector posts, and the clip further comprises:

The thumbpad defining an upper surface ergonomically configured for contacting a person's hand, the thumbpad also defining a lower surface opposed to the upper surface, wherein the first and second connector posts depend downwardly from the lower surface; and an offset shank having a first end connected to the thumbpad and a second end distanced from the thumbpad.

3. The clip of claim 2, wherein at least one connector post is a ratchet connector having a shaft and a plurality of ratchet teeth extending outwardly from the shaft for cooperating with the vehicle to hold the first post in one of the holes.

4. The clip of claim 3, wherein the harness support surface is established by a harness support element, the harness support element defining first and second ends, the harness support element being connected to the offset shank substantially intermediate the first and second ends, wherein the thumbpad, offset shank, and harness support element are formed unitarily together.

5. The clip of claim 4, wherein the harness support element defines first and second tape guide necks near the first and second ends, respectively, and wherein the first and second ends of the harness support element establish respective tape guide ears protruding away from the respective tape guide necks.

* * * * *